United States Patent [19]

Talmadge

[11] Patent Number: 4,809,185

[45] Date of Patent: Feb. 28, 1989

[54] SECURE METERING DEVICE STORAGE VAULT FOR A VALUE PRINTING SYSTEM

[75] Inventor: Paul C. Talmadge, Ansonia, Conn.

[73] Assignee: Pitney Bowes Inc., Stamford, Conn.

[21] Appl. No.: 902,844

[22] Filed: Sep. 2, 1986

[51] Int. Cl.⁴ .............................................. G06F 15/20
[52] U.S. Cl. .............................................. 364/464.02
[58] Field of Search ............................. 364/464, 466

[56] References Cited

U.S. PATENT DOCUMENTS

| | | |
|---|---|---|
| 3,194,946 | 7/1965 | Rabinow . |
| 3,255,439 | 6/1966 | Simjian . |
| 3,428,948 | 2/1969 | Simjian . |
| 3,596,247 | 7/1971 | Eckert, Jr. . |
| 3,702,464 | 11/1972 | Castrucci . |
| 3,890,599 | 6/1975 | Simjian . |
| 3,990,558 | 11/1976 | Ehrat . |
| 4,097,923 | 6/1978 | Eckert, Jr. et al. . |
| 4,146,778 | 3/1979 | Wain . |
| 4,218,011 | 8/1980 | Simjian . |
| 4,222,518 | 9/1980 | Simjian . |
| 4,226,360 | 10/1980 | Simjian . |
| 4,249,071 | 2/1981 | Simjian . |
| 4,253,158 | 2/1981 | McFiggans ................. 364/900 |
| 4,258,252 | 3/1981 | Simjian . |
| 4,268,817 | 5/1981 | Simjian . |
| 4,285,050 | 8/1981 | Muller . |
| 4,301,507 | 11/1981 | Soderberg et al. ........... 364/464 |
| 4,317,028 | 2/1982 | Simjian . |
| 4,422,148 | 12/1983 | Soderberg et al. . |
| 4,436,992 | 3/1984 | Simjian . |
| 4,458,109 | 7/1984 | Mueller-Schloer . |
| 4,481,604 | 11/1984 | Gilham et al. . |
| 4,566,106 | 1/1986 | Check, Jr. .................... 371/67 |
| 4,575,621 | 3/1986 | Dreifus . |
| 4,628,457 | 12/1986 | Manduley .................... 364/464 |
| 4,629,871 | 12/1986 | Scribner et al. . |
| 4,649,266 | 3/1987 | Eckert .................... 364/464 X |

OTHER PUBLICATIONS

R. McIvor, "Smart Cards" Scientific American, vol. 235, No. 5, Nov. 1985, pp. 152-158.

Primary Examiner—Parshotam S. Lall
Assistant Examiner—Edward R. Cosimano
Attorney, Agent, or Firm—Donald P. Walker; David E. Pitchenik; Melvin J. Scolnick

[57] ABSTRACT

A value printing system, such as a postage metering system, is disclosed wherein the secure meter accounting registers are removably connected to the meter. The registers are maintained redundantly within two dissimilar types of non-volatile memory devices, the devices being enclosed within an accounting vault. The vault may have the form of a small enclosure which may have the dimensions of a typical credit card. The invention provides for the local recharging of the meter postal funds by the removal of a first vault having an indication of depleted postal funds and the insertion of a second vault having an indication of available funds. In addition, by maintaining the meter accounting registers external to the system, the invention provides for a postage metering system wherein the necessity of the complex mechanical security devices of the prior art is eliminated.

21 Claims, 4 Drawing Sheets

SECURE METERING DEVICE STORAGE VAULT FOR A VALUE PRINTING SYSTEM

BACKGROUND OF THE INVENTION

A. Field of the Invention

This invention relates generally to value printing systems and, more particularly, to a system wherein the accounting registers of the secure metering device are redundantly maintained within a plurality of non-volatile memory devices of different types, the devices being provided on a card or module adapted for insertion and removal from the system.

B. Prior Art

Value printing systems, such as a postage printing system, typically are comprised of a secure metering device for recording the values printed, a control device for controlling a printer, and the printer itself for applying indicia representative of the value to a document.

The secure metering device is typically comprised of registers, known as ascending and descending registers, which are utilized to record the values printed. Typically, the ascending register is incremented by the value printed while the descending register is decremented by the value. When the descending register has been so decremented to some minimum value, indicating that the funds originally allocated to the meter have been depleted, the metering device inhibits the further printing of indicia until the meter is "recharged", or resupplied with funds. As is well known, it is a requirement that a postage meter maintain an accurate and secure record of the value of the postage applied. The use of a non-volatile memory ensures that the postage accounting data stored therein will be accurately maintained even when the meter power is intentionally or unintentionally interrupted.

It has been known to utilize more than one non-volatile memory device within a postage meter in order to further ensure the security and accuracy of the postage accounting data, the data typically being redundantly maintained within each of the non-volatile memories. Illustrative of such a postage meter is a U.S. Pat. No. 4,566,106, issued on Jan. 21, 1986 to F. Check, Jr., and entitled "Electronic Postage Meter Having Redundant Memory", said U.S. patent being assigned to the assignee of the present application Check teaches the use of redundant non-volatile random access memories controlled by a microprocessor system, the memories having separate groups of address and data lines to minimize identical errors in data stored therein. Also illustrative of a postage meter having redundant non-volatile memories is a copending application No. 643,219, filed Aug. 22, 1984, entitled "Non-Volatile Memory System With Real Time And Power Down Data Storage Capability For An Electronic Postage Meter". This copending application discloses a method and associated apparatus for increasing the reliability of the stored accounting data which reflects the transactions of an electronic postage meter, including the steps of and associated apparatus for providing a first non-volatile memory capable of storing accounting data which represents the postage meter transactions; updating the first non-volatile memory in real time for each postage transaction to provide a current record of the accounting data for each postage transaction on-the-fly; providing a second non-volatile memory capable of storing accounting data representing the postage meter transactions during a power down cycle of the postage meter; providing a volatile memory capable of storing accounting data which represents the postage meter transactions; updating the volatile memory in real time for each postage transaction to provide a current record of the accounting data for each postage transaction; and transferring the accounting data from the volatile memory to the second non-volatile memory during the power down cycle of the postage meter.

Although the aforementioned postage meters employing redundant non-volatile memories are well suited for their intended applications, a problem arises when it is desired to physically separate the accounting registers and, hence, the non-volatile memories, from the postage meter enclosure For instance, it may be desireable to provide the accounting registers on a card or module adapted for insertion and removal from the postage meter system in order to provide a postage meter which does not require a complex mechanical or electrical security system. It may further be desireable to provide such a card or module in order to enable the postage funds within the meter to be periodically recharged.

As may be appreciated, non-volatile memory devices which are contained within a module or card enclosure adapted for removal from a postage meter system may be subjected to severe electrical and mechanical stresses. For example, the card may be inadvertently dropped upon a hard surface, or the card may be exposed to extremes of temperature and humidity. The devices provided with the card may also be exposed to static electric discharge. Furthermore, the card or module may be inadvertently inserted or withdrawn from a postage meter system which is in an operational condition, thereby possibly exposing the memory devices within to fluctuations upon their respective power or data busses. Thus, it may be seen that providing the accounting registers external to the meter may place extreme environmental, mechanical and electrical stresses upon the non-volatile memories containing the postal accounting registers.

It is, however, a desireable goal to so provide the registers external to the meter in that such a postage meter may be conveniently and rapidly recharged with postal funds.

As is well known, in order to recharge many postage meters of the prior art it was often necessary to physically convey the entire system, including the printer, to a postal facility or some other similar facility. Such a recharging scheme is obviously disadvantageous in that the system was required to be removed from service during the recharging procedure. This requirement was due partially to the fact that the metering device and the printer were integrated into an assembly of unitary construction, such an assembly typically having a complex mechanical mechanism to couple the metering device to the printer in order to prevent the use of the printer apart from the meter.

In response to the aforementioned disadvantage of requiring the removal of the system to a recharging facility, it has also been known in the prior art to provide for the recharging the metering device locally, that is, without the physical removal of the system.

Illustrative of one such local recharging technique, wherein the meter is recharged by the use of a punched card or a data entry medium purchased at a postal or some other facility and thereafter inserted into the meter to transfer the amount of funds appearing on the card or coupon into the meter, are a U.S. Pat. No. 3,194,946, issued on July 13, 1965 to Jacob Rabinow, entitled "Postage Meter Set by Cards", and the following Luther G. Simjian U.S. Pat. Nos. 4,218,011, issued Aug. 19, 1981, entitled "Coupon Controlled Metering Device", 4,222,518 issued Sept. 16, 1980, entitled "Metering System", 4,258,252, issued on Mar. 24, 1981, entitled "Check Controlled Metering Device", and 4,268,817, issued May 19, 1981, entitled "Check Controlled Metering Device." Also illustrative of this recharging technique is a copending application No. 108,261, filed Dec. 28, 1978, to Check Jr. et al, entitled "An Electronic Postage Meter System Settable By Means Of A Remotely Generated Input Device".

While postage printing systems constructed in accordance with the aforementioned U.S. patents do provide a means for locally recharging the metering device, the use of such systems are disadvantageous in other respects. One such disadvantage is that the secure accounting registers of the metering device are still contained within the system, thereby necessitating the use of the aforementioned complex mechanical mechanism to securely couple the meter to the printer. Another disadvantage of such prior art systems is that the overall system cost may be higher due to the requirement of providing a suitable punched card or coupon reading and validating device within the system.

It has also been known in the prior art to provide for the local recharging of the metering device by means of a data link to a central station or registering device. Illustrative of this recharging technique are two Luther G. Simjian U.S. Pat. Nos. 3,255,439, issued on June 7, 1966, entitled "Postage Metering System" and 3,428,948, issued on Feb. 18, 1969, entitled "Postage Metering System" and a U.S. Pat. No. 3,596,247, issued on July 27, 1971, to A. Eckert entitled "Automatic Register Setting Apparatus", and a U.S. Pat. No. 4,097,923 to Eckert et al, issued on June 27, 1978, entitled "Remote Postage Meter Charging System Using An Advanced Microcomputerized Postage Meter", said last two U.S. patents assigned to the assignee of the present application.

While postage printing systems constructed in accordance with the aforementioned U.S. patents do also provide a technique for locally recharging the metering device from a remote location, they suffer from similar disadvantages as those beforementioned. Those disadvantages are the inclusion of the meter accounting registers within the system, thereby requiring the securing of the entire system, and the added cost and complexity of providing within the system a suitable data link communications means.

In addition, these systems suffer from an additional disadvantage in that if the data link or the central station, which may be a computer system, malfunctions, the postal printing system may be required to remain out of service for an extended period of time, or until a time that the malfunction is corrected and the metering device can be recharged with funds.

It is therefore a primary objective of the present invention to provide a postal mailing system which may be recharged with postal funds without requiring the removal of the system to a remote recharging facility.

It is also a primary objective of the present invention to provide a postal mailing system wherein the secured postage meter accounting registers are maintained external to and separable from the system, thereby eliminating the requirement of mechanically securing the metering device and the printer.

It is also a primary objective of the present invention to provide a postal mailing system wherein the external postage meter accounting registers are redundantly maintained within two separate types of non-volatile storage devices, thereby providing an even greater degree of security for the postage meter accounting data.

It is also a primary objective of the present invention to provide a postal mailing system wherein the external postage meter accounting registers are contained within a low cost credit card-like enclosure which may be readily transported and inserted within the postal mailing system.

SUMMARY OF THE INVENTION

The foregoing disadvantages of the postal mailing systems of the prior art are overcome and the aforementioned primary objectives are achieved by a value printing system constructed in accordance with the invention. In an illustrative embodiment, a postal mailing system is disclosed which is comprised of a metering device for recording the values of postage indicia printed, a control device for controlling the operation of a printer, and the printer itself which prints indicia representative of a value of postage upon a document. In addition, the system is adapted for having the secure accounting registers of the metering device removably coupled to the metering device, the registers being redundantly stored by two different types of non-volatile storage devices so that a data disrupting event will not affect the data stored within each device. The storage devices are contained within a low cost accounting enclosure, or vault, which may have the form of a thin module, such as a credit card-like enclosure. By maintaining the secure accounting registers separate from the system within such a vault and by the use of other security techniques such as storing the postage indicia pattern data within the metering device and encrypting the pattern data before communicating the indicia to the printer, the system need not be physically secured with complex mechanical mechanisms, as are the systems of the prior art.

In addition, the system may have the postal funds locally recharged by the insertion of a new vault card obtained from a recharging facility, the new card being charged with a desired amount of postal funds. By having two or more such vault cards, an operator of the system need not experience the loss of the use of the system. When the funds within a first vault card are depleted the user may simply remove the first card and insert a second card which still has available postal funds remaining therein.

In accordance with an illustrative embodiment of the invention a postal mailing system is disclosed which includes an electronic postage meter which has secure accounting registers stored redundantly in an external module or card, the registers being stored in an electronic form within a non-volatile memory (NVM) device and also in magnetic form on a strip of magnetic media suitable for being recorded upon and read back by a read/write head. The meter also comprises an accounting processing unit. The accounting processing unit is comprised of a processing device, in this embodiment a microcomputer, and a NVM data protection unit connected to the microcomputer. In addition, there is also connected to the microcomputer an indicia memory, wherein a representation of the fixed pattern of the postage indicia is stored in digital form.

The postage meter provides a capability of generating an encrypted validation number and the fixed pattern of the indicia for printing on a document. This generated validation number provides a method for detection of unaccounted printing and supplies the postal authorities with information on the meter accounting registers. A high speed printer of this embodiment would be located within the mailing machine or some other host which would also be a part of the mailing system.

The control device or mailing machine of this embodiment comprises principally a second microcomputer for the control of the high speed printer. The meter is able to communicate over a high speed, secure data bus with the control device to perform all the accounting functions, to accept funds, reset to zero for removal from service and any other actions that electronic postal mailing systems generally perform. The meter is also able to communicate with the control device to provide a digital representation of the fixed pattern of the postage indicia itself. The electronic postage meter of this embodiment, as before-mentioned, does not print postage but supplies an electronic signal which will represent an encrypted validation number for the postage amount that it accounts for and, in addition, a digital representation of the fixed portion of the postage indicia. In this embodiment the encrypted validation number is to be printed along with a dollar amount, the meter serial number and the date of issue. The validation number is typically printed in a system approved format that would be appropriate for automatic detection if required. This encrypted validation number is used to detect illegal printing of a dollar amount that has not been accounted for.

In this illustrative embodiment the mailing machine's processing unit would receive a dollar amount from a keyboard or the like and would send that information to the processing device of the meter. The meter would thereafter generate an encrypted validation number using a key and plain text supplied by the processing unit of the meter. The plain text would be the postage information and meter accounting registers of the meter. It should be recognized that other information such as date, origin of the document, destination, etc., can also be used depending on the need and desires of user. The key would be internally stored within the NVM.

The meter would then send the validation number along with the meter serial number and a representation of the fixed pattern of the postage indicia to the processing unit of the mailing machine. The processing unit within the mailing machine thereafter sends the postage indicia, meter serial number, dollar amount and validation number to a printer. The printer, in turn, prints the postage indicia, date, meter serial number, dollar amount and validation number on a mailpiece or document.

Thus, in this illustrative embodiment a microcomputer within the meter would be in communication with a microcomputer within a mailing machine or some other type of host unit. In this system, the postage meter would supply an enabling electronic signal which represents an encrypted validation number and the fixed portion of the postage indicia to the mailing machine. After receiving the enabling signal from the postage meter, the mailing machine would activate its printer to print the postage indicia including the desired postage amount.

The postage meter of this embodiment contains no integral accounting registers, such as ascending and descending registers, the registers being instead maintained externally to the meter, thereby making the meter less complex and less expensive. In addition, a postage meter of this type could be adapted to a wide variety of mailing machines or other peripheral units. The encryption scheme utilized to protect the validity of the postage indicia can be any of a variety of schemes known to those skilled in the art including, for example, those that have been used typically to protect the accounting information located within the meter.

This system provides for a simple and low cost method to recharge the postal funds of the meter by the insertion into the meter of a vault card having available postal funds indicated therein. The use of the invention also provides for a simpler and less expensive postal mailing system in that the meter and printer may be included within an enclosure that need not be mechanically secured against tampering because the meter's accounting registers are securely maintained separately from the system.

The system also provides for the rapid printing of postage indicia by the utilization of the high speed, secure communications bus between the meter and the host and, additionally, by the use of the high speed printer, such as an ink jet printer.

BRIEF DESCRIPTION OF THE DRAWINGS

The above-mentioned and other features of the invention will become better understood with reference to the following detailed description when taken in conjunction with the accompanying drawing, wherein like reference numerals designate similar elements in the various figures, and in which.

DETAILED DESCRIPTION

The invention is disclosed in the context of a postage meter system, however, other types of metering systems may have the invention applied thereto with equal success. Such other types of metering systems include parcel service meters, tax stamp meters, check writing meters, ticket imprinters, and other similar value printing systems and devices.

Cross reference is hereby made to two related patent applications which are incorporated herein by reference in their entireties; an application entitled "Secure Vault Having Electronic Indicia For A Value Printing System" by Paul T. Talmadge, Ser. No. 902,903, filed on Sept. 2, 1986, and an application entitled "A Secured Printer For A Value Printing System" by Paul T. Talmadge and Arthur Chicknes, Ser. No. 902,904, filed on Sept. 2, 1986.

Figure 1:
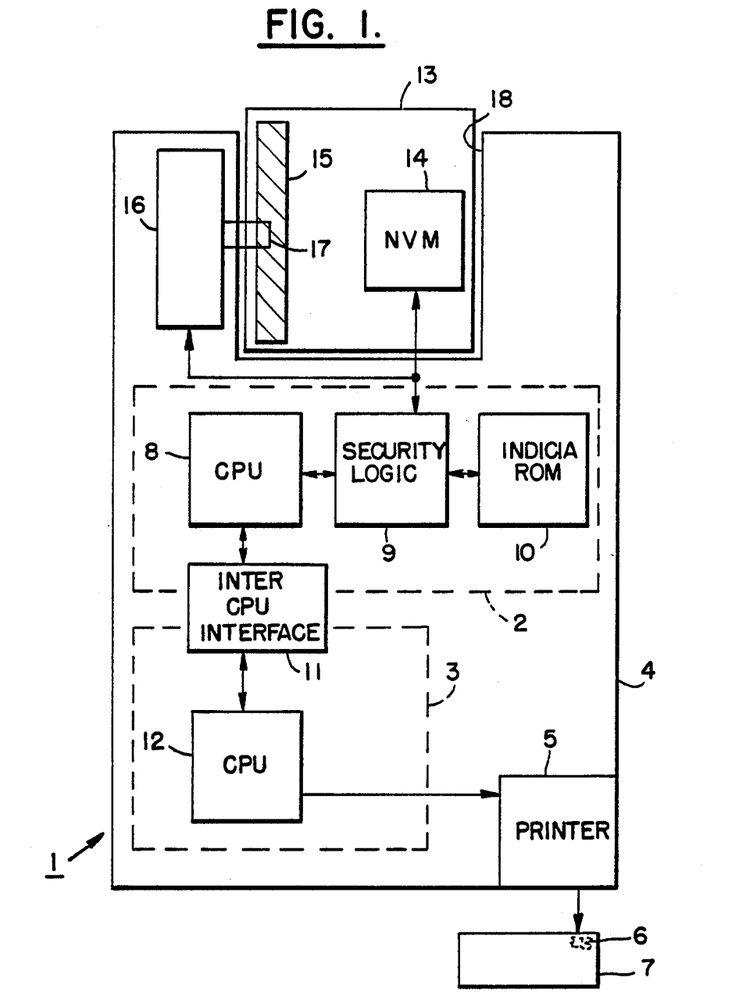
FIG. 1 is a block diagram of the electronic postal mailing system.

Referring now to FIG. 1 the postage metering system 1 comprises in this embodiment of the invention a postage meter 2 and a system controller, or host, 3. Meter 2 and host 3 may be contained within a single enclosure 4, as may be a printer 5 Printer 5 is operable for printing an indicia 6 representative of a value of postage upon a document 7.

As may be seen, meter 2 is comprised of a central processing unit (CPU) 8, which may be a microcomputer or a microprocessor, which in turn is coupled to a security logic circuit 9 and an indicia ROM 10, wherein a fixed portion of the postage indicia 6 is stored in digital form. In addition, CPU 8 is coupled to an inter-CPU interface 11 which provides for bidirectional communication with a CPU 12 within the host 3.

In accordance with the invention, security logic circuit 9 couples CPU 8 to an accounting vault 13. Vault 13 is comprised of two dissimilar non-volatile storage devices, namely a non-volatile memory 14 and a magnetic media 15, which may be a strip of metalization, suitable for magnetically recording and playing back digital information. In order to provide for the recording and playing back of the digital information a magnetic read/write device 16 is provided to interface CPU. 8, via security logic 9, with the media 15. Device. 16 is comprised of a read/write head 17 which is moveably mounted such that it may be moved along the media 15, thereby writing or reading data upon the length of media 15.

As can be seen, vault 13 has the form of a separable module which may have the physical dimensions of a typical credit card. In operation, vault 13 is inserted within an opening 18 provided within enclosure 4 such that it is electrically connected with an interfacing means (not shown) whereby NVM 14 is coupled to CPU 8 via security logic 9. Head 17 is disposed such that, when vault 13 is so inserted, the head 17 is operably coupled to media 15.

Typically, a keyboard or the like (not shown) sends the information representing the postage amount to microcomputer 12. Thereafter, the microcomputer 12 sends a request signal to microcomputer 8 consisting of the postage amount to obtain a validation number for printing.

The microcomputer 8, after receiving the request signal from microcomputer 12, will determine if sufficient postal funds, as indicated by the meter accounting registers within vault 13, are available to print the desired postage amount. If there are sufficient funds microcomputer 8 will compute an encrypted validation number based in part on a key stored within the NVM 14. Access to the NVM 14 is gained through security logic 9 which provides for ensuring the date integrity of the accounting, encryption, and other data stored within vault 13. The validation number, by way of example, may be computed by combining the serial number of the postage meter and a secret code stored within the NVM 14. As may be appreciated, if vault 13 is not connected to system 1, the validation number cannot be computed by the meter 2, thereby preventing the printing of the postage indicia 6.

The validation number will thereafter be transmitted to the microcomputer 12 of the host 3 along with a representation of the fixed pattern of the postal indicia 6, stored in an indicia ROM 10, to initiate the printing process. The printer 5, as before-mentioned, in turn will print on the document 7 the information communicated from the microcomputer 12. Thus, the meter 2 provides to the host 3 a signal consisting of the fixed pattern of the postage indicia, the meter serial number, and the validation number to be printed on document 7. The host 3 in response to this signal provides the postage amount. In this embodiment, either the host 3 or the meter 2 can provide the city, state and date information. In addition, for each such indicia 6 printed, meter 2 updates the accounting data stored within NVM 14 and media 15, the data being redundantly stored within each to lessen the probability of error. Such updating typically includes deducting from the current amount of the remaining, or available postal funds, the amount dispensed by the printing of indicia 6. Thus, it may be seen that for each indicia printed, the amount of the available postal funds is correspondingly reduced by a given value of the indicia. When the amount of available funds is depleted, that is when the amount falls below the amount required to print an indicia, the meter 2 will no longer provide to host 3 the aforementioned enabling signal consisting of the validation number and pattern of the postage indicia. Thus, the host 3 will be disabled from activating printer 5 to print any further indicia until the amount of available postal funds is recharged or replenished. In accordance with the invention, the postal funds may be easily replenished by uncoupling a first vault 13 having an indication of depleted funds stored within, and coupling, or connecting, to meter 2 a second vault 13 which has an indication of available funds.

Figure 2:
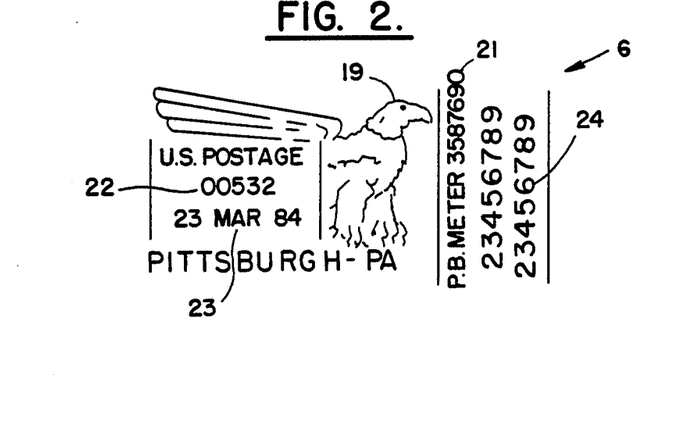
FIG. 2 shows the postage indicia printed by the postal mailing system of FIG. 1.

Referring now to FIG. 2, the indicia 6 may be seen to have a graphical, fixed pattern 19, a dollar amount 22, a date and a city of origin 23 and a meter serial number 21. In addition, the indicia 18 will include a validation number 24. Pattern 19 is said to be fixed inasmuch as it is not necessary to determine it for each indicia printed, unlike the amount 22. As may be appreciated, although the pattern 19 is shown in FIG. 2 to have the form of a graphical representation of an eagle, a variety of predetermined, distinctive patterns could be used, depending on the particular application of a value printing system embodying the invention.

Figure 3:
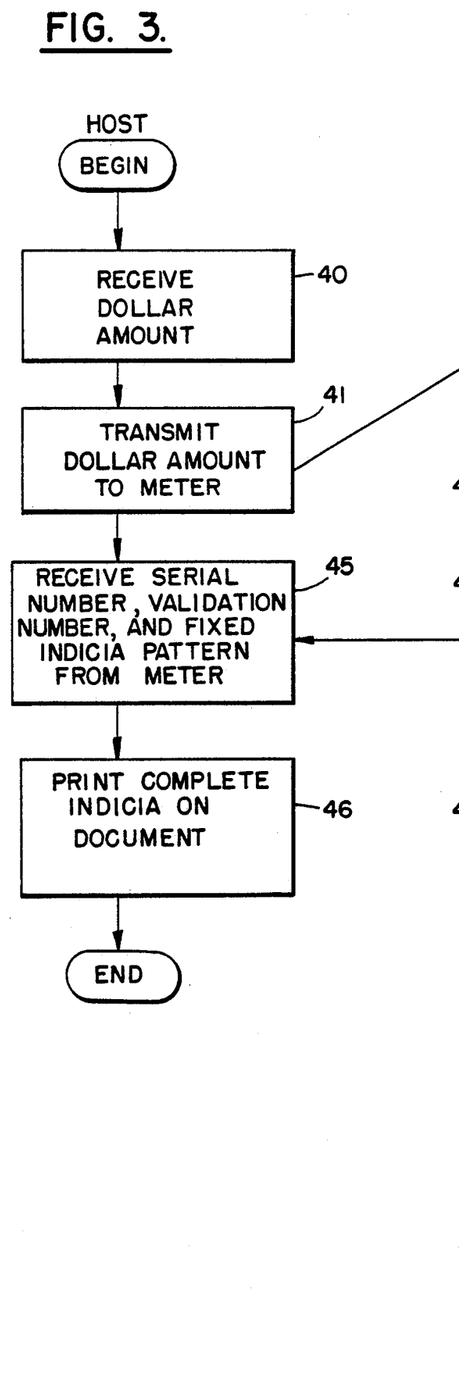
FIG. 3 is a flow chart of the operation of the host of the postal mailing system of FIG. 1.
Figure 4:
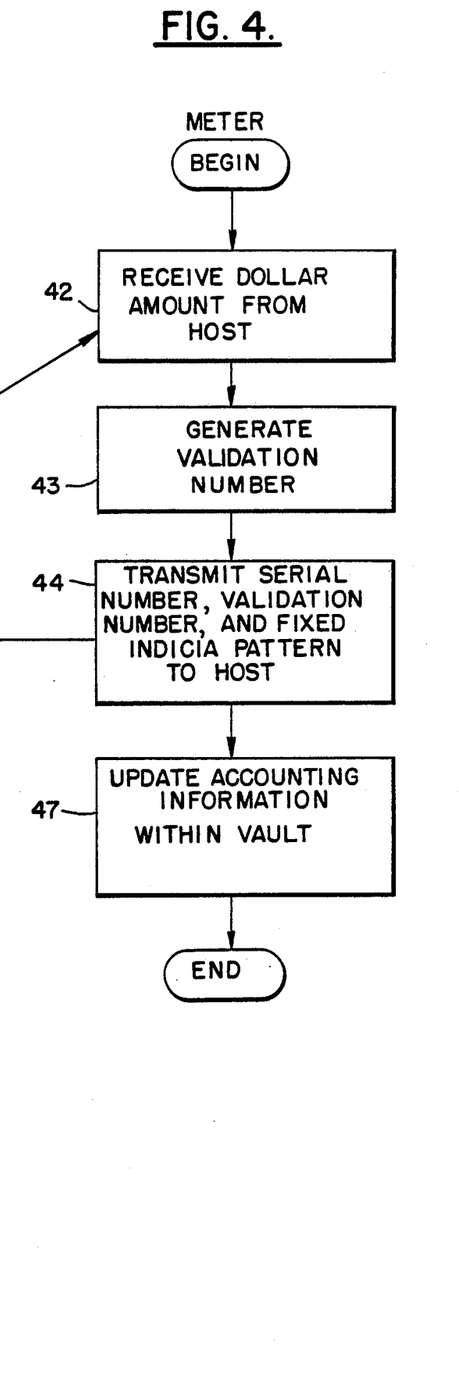
FIG. 4 is a flow chart of the operation of the meter of the postal mailing system of FIG. 1.

FIGS. 3 and 4 are flow charts describing the operation of the postal mailing system. Initially the host 3 (FIG. 1) will receive a required postage dollar amount from a source, whether that be an operator or some other source, indicated by box 40. Thereafter, the dollar amount is transmitted to the meter 2 (FIG. 1), box 41. Referring to FIG. 4, the meter 2 will then receive that dollar amount from the host 3, box 42, and will thereafter generate a validation number, box 43. After generating the validation number, the meter 2 will thereafter transmit the meter serial number, the validation number, which includes postal information, and the fixed portion of the indicia back to the host 3, box 44. Referring back to FIG. 3, the host 3 will then receive the meter serial number, validation number, and fixed portion of the indicia from the meter, box 45. Thereafter the printer 5 (FIG. 1) will print on the document 7 the fixed portion of the postage indicia 19, the dollar amount 22, the date 23, the meter serial number 21, and the validation number 24, box 46. Referring to FIG. 4, the meter 2 will then update the accounting information stored within vault 13 in accordance with postage dollar amount, as indicated at box 47.

Inasmuch as a stated purpose of the postage meter of the invention is to provide for the high speed printing of postage indicia on documents, the transfer of data between meter 2 and host 3 must be accomplished in a high speed and efficient manner. This requirement may be made even more evident by considering the representation of the fixed pattern 19 of the postage indicia 6 stored in the indicia ROM 10 of FIG. 1.

Typically, a postage indicia represented in a format suitable for printing by a dot matrix type of printing device, has a standard size of one inch by two inches and is comprised of 240 columns each having 120 dots, each dot possibly having one of three levels of intensity. The total number of bits required to represent such a dotmatrix type of indicia may be 68,400, or approximately 10,800 bytes. As may be appreciated, if the postage indicia is supplied to the host 3 for each document printed, a considerable amount of data must be rapidly transferred between meter 2 and host 3, especially considering that in a high speed postage metering system three or more documents may be so printed every second.

In addition to the requirement for a high speed data communications bus linking the meter 2 and the host 3, such a high speed dot matrix printing requirement necessitates the use of a suitable high speed printer. Such a printer must, in addition to having a capability for high speed operation, be capable of providing a print quality and other print characteristics which make it suitable for printing postage and other valuable indicia. One such suitable printer is an ink jet printer, wherein droplets of ink are electrostatically deflected at high speeds by electronically controlled deflection plates, as is well known in the art.

Figure 5:
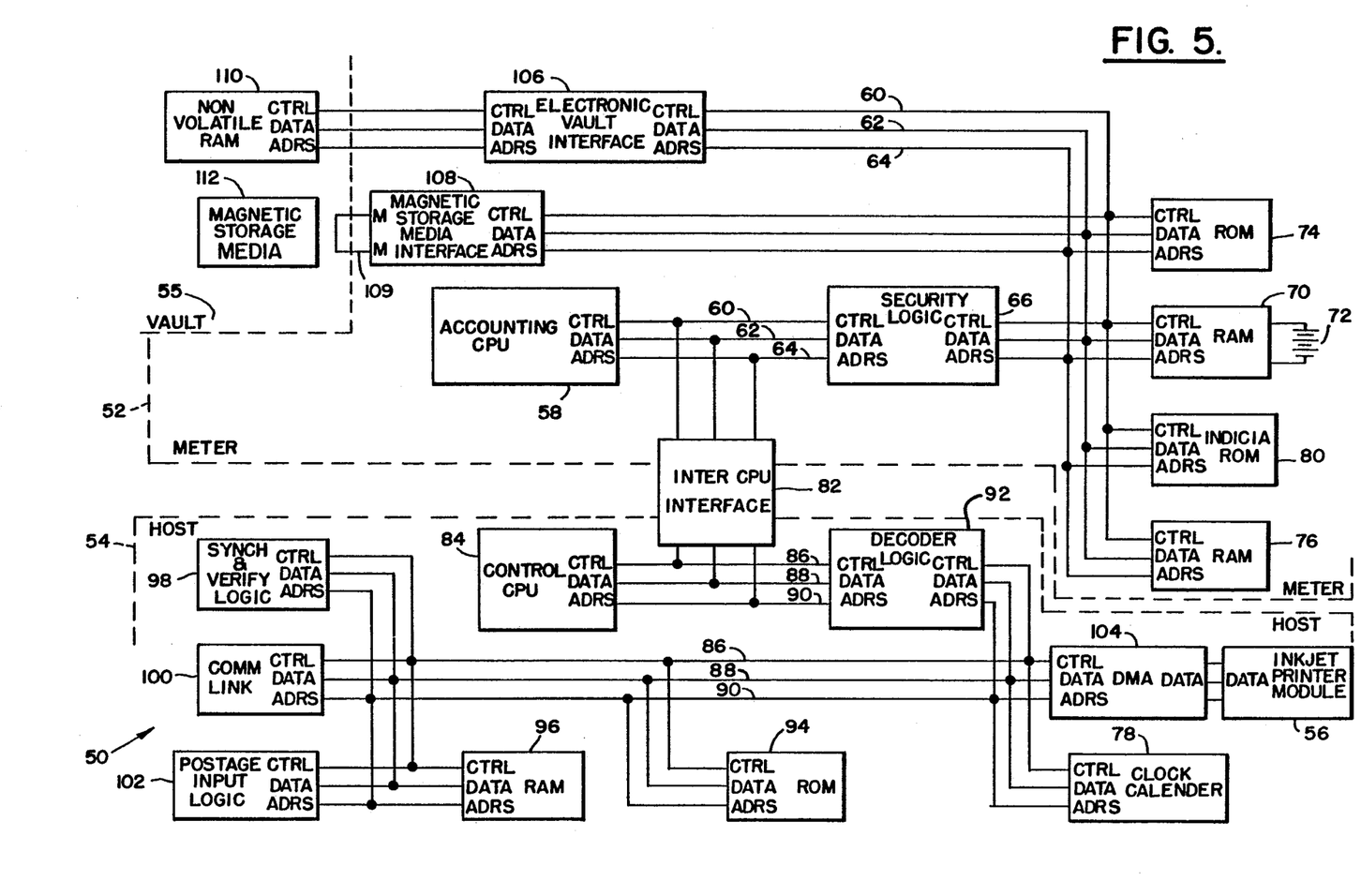
FIG. 5 is a block diagram of one embodiment of the postal mailing system.

Referring now to FIG. 5 there is shown in block diagram form one embodiment of a high speed, modularized postage metering system 50. System 50, as shown, is comprised of a postage meter, or Meter 52, a print control module, or Host 54, and an ink jet printer module 56. Coupled to Meter 52 is a secure accounting module, or Vault 55.

Meter 52 is further comprised of an Accounting CPU 58, which may be a microprocessor such as the Z-80 manufactured by the Zilog Corporation and other manufacturers.

As is well known, such a microprocessor has a bus structure characterized by a control bus 60, a data bus 62, and an address bus 64. The purpose of the busses is to control, identify, and transfer program instructions and data to and from memory and input/output (I/0) devices connected to the busses.

Connected to the busses 60, 62 and 64 is a Security Logic 66 circuit which monitors the addresses generated by CPU 58 in order to control access to the memory devices contained within Vault 55. These memory devices, namely nonvolatile RAM (NOVRAM) 110 and magnetic storage media (MSM) 112 each contain a copy of the ascending and descending postal accounting registers and other accounting data generated by CPU 58. Coupling the NOVRAM 110 to the Meter 52 is an Electronic Vault Interface (EVI) 106. Coupling MSM 112 to Meter 52 is a magnetic storage media interface (MSMI) 108 having a read/write head 109. The description of the operation of EVI 106 and MSMI 108 will be presented in detail hereinafter.

A security logic circuit that could be utilized for the Security Logic 66 is disclosed in U.S. patent application No. 710,802 entitled "A Postage Meter With A Non-Volatile Memory Security Circuit," filed on Mar. 12, 1985, and assigned to the assignee of the subject application. The circuit disclosed in this application provides means for limiting the amount of time that the accounting memories may be continuously enabled and also provides other protective mechanisms so that the valuable accounting information stored therein cannot be inadvertently modified or destroyed.

Also connected to CPU 58 by the busses 60, 62 and 64 are a program storage read only memory (ROM) 74 wherein the operating instructions and constants required by CPU 58 are stored. In addition, two RAM devices 70 and 76 are also provided to store temporary data and other information required by CPU 58 during the execution of its normal operating program. As is well known, such a device is commonly referred to as a "scratchpad" RAM. As may be seen, RAM 70 has a battery 72 connected thereto, thus preventing the loss of certain system temporary data in the event of a power failure or the operator deenergizing the system 50.

In addition to the above described devices connected to the busses 60, 62 and 64 there is provided an indicia ROM 80. ROM 80 has permanently stored within a representation, or copy, of the fixed pattern 19 (shown in FIG. 2) of the postage indicia 6. As was described above, in this embodiment of the invention fixed pattern 19 is stored as a series of data bytes representative of the dot matrix pattern required to print fixed pattern 19. The bytes of data representative of this fixed pattern 19 may be provided to Host 54 by Meter 52 for each postage indicia printed. Thus a high degree of security is achieved in the use of the system 50 in that the graphical format of the postage indicia cannot be purposely or inadvertently reproduced by Host 54 unless the Meter 52 is operational and, additionally, unless the required communication between the two is accomplished in a predefined and specific manner. Thus, the accounting by Meter 52 of each postage indicia printed is assured.

As may be appreciated, the implementation of this feature may be carried out in a variety of ways. For example, in order to provide a greater degree of security the fixed pattern 19 stored within ROM 80 may be encrypted by Meter 52 before being provided to Host 54. As another example, the fixed pattern 19 could be stored within ROM 80 as a predetermined sequence of data suitable for generating the graphical pattern of the indicia when the data is operated on by a mathematical formula stored within Meter 52 or Host 54.

In order to provide an efficient and high speed means for transferring the possibly large amount of data between Meter 52 and Host 54, a high speed data communications means is required. This communications means is provided by an Inter-CPU Interface 82 which couples CPU 58 to a control CPU 84 within Host 54, the communication being accomplished by the use of a memory "swapping" or interchange technique. The operation of such a data communications means is described in the aforementioned copending application Ser. No. 902,903, filed Sept. 2, 1986.

A function of CPU 84 is to control the printing of postage indicia on a document (not shown in FIG. 5) by printer module 56 in response to document position and system timing inputs provided by a mailing machine (not shown) coupled to Host 54. Such mailing machines typically are comprised of document feeders and conveyors and function to collate documents for insertion within an envelope, the envelope then being printed with the correct postage having a predetermined, given value. In a high speed mailing machine there may be three or more envelopes per second which require the printing of postage thereon. Such high speed operation necessitates that CPU 84 operate in a "real time" environment and, hence, be of a suitable type for this operation. One suitable type of microprocessor for such a demanding application is a member of the 68,000 family of microprocessors, such microprocessors being manufactured by the Motorola Corporation and other manufacturers.

Connected to CPU 84 are a plurality of busses, namely a control bus 86, a data bus 88 and an address bus 90 for coupling CPU 84 to a plurality of memory and I/O devices.

A decoder logic 92 block operates to decode the address 90 and control 86 busses, in a well known manner, in order to generate one of a plurality of device select signals (not shown) for activating a proper one of the devices connected to the busses 86, 88 and 90 of CPU 84.

An instruction ROM 94 contains the operating instructions and constants required by CPU 84 to carry out its function of controlling the printing of postage indicia. Scratchpad RAM 96 is utilized by CPU 84 to contain variable and temporary data required for operation.

In order to provide CPU 84 with a means to communicate with the mailing machine and other external devices a Sync and Verify Logic 98 block and a Postage Input Logic 102 block are provided. The purpose of the Sync and Verify Logic 98 is to provide CPU 84 with inputs from the mailing machine (not shown), such inputs being representative of timing and position information relating to the documents being processed by the mailing machine. In addition, Sync and Verify Logic 98 provides for outputting the required control signals from CPU 84 to the mailing machine (not shown).

Postage Input Logic 102 block provides for inputting data representative of the dollar amount of postage required by each document. This input may be provided by, for example, an operator keyboard or the output of a document weighing machine. The amount of postage required by each document is provided by CPU 84 to CPU 58, as has been previously described, in order that Meter 52 may make an accounting of the amount within memory devices 110 and 112.

Also connected to CPU 84 may be a clock/calendar device 78 which provides for maintaining the current time and date information. Such information is required, typically, for printing as a part of the postage indicia. As may be appreciated, the clock/calendar device 78 could alternatively be contained within Meter 52 or, alternatively, both the Meter 52 and Host 54 could each contain such a clock/calendar device. Appropriate software routines in each of the Meter 52 and Host 54 could then be utilized, before the printing of a postage indicia, to verify that the time and date in each are in agreement, thereby providing a still further degree of security.

In addition to the above described logic blocks, a Comm Link 100, or communications logic block, is provided for interfacing CPU 84 to other devices by way of a standard communications link, such as RS-232-C or IEEE-488 or some other general purpose serial or parallel communications channel. As examples of devices that may be connected to Comm Link 100 are a printer for printing system status and accounting information or a modem for allowing telephonic communications with a central computer, such as a postal facility accounting computer.

In order to provide CPU 84 with the ability to perform one of its basic functions, that is the printing of postage indicia, a high speed direct memory access (DMA) 104 device is provided to couple the busses 86, 88 and 90 to the Ink Jet Printer Module 56. As is well known, such a DMA device typically functions to transfer data, without the intervention of the system microprocessor, between an I/0 device, such as Module 56, and the microprocessor memory.

In operation, CPU 84 may temporarily store within RAM 96 the data bytes representative of the fixed pattern of the postage indicia provided by Meter 52 and, additionally, data representative of the variable portions such as the postage amount 22 and date 23 (as shown in FIG. 2). The complete indicia would thereby be represented as a plurality of bytes descriptive of, for example, the dot matrix pattern required to form the indicia 6. DMA 104, after activation by CPU 84, functions to automatically provide MODULE 56 with indicia dot matrix data from RAM 96 for printing on a document.

Figure 6:
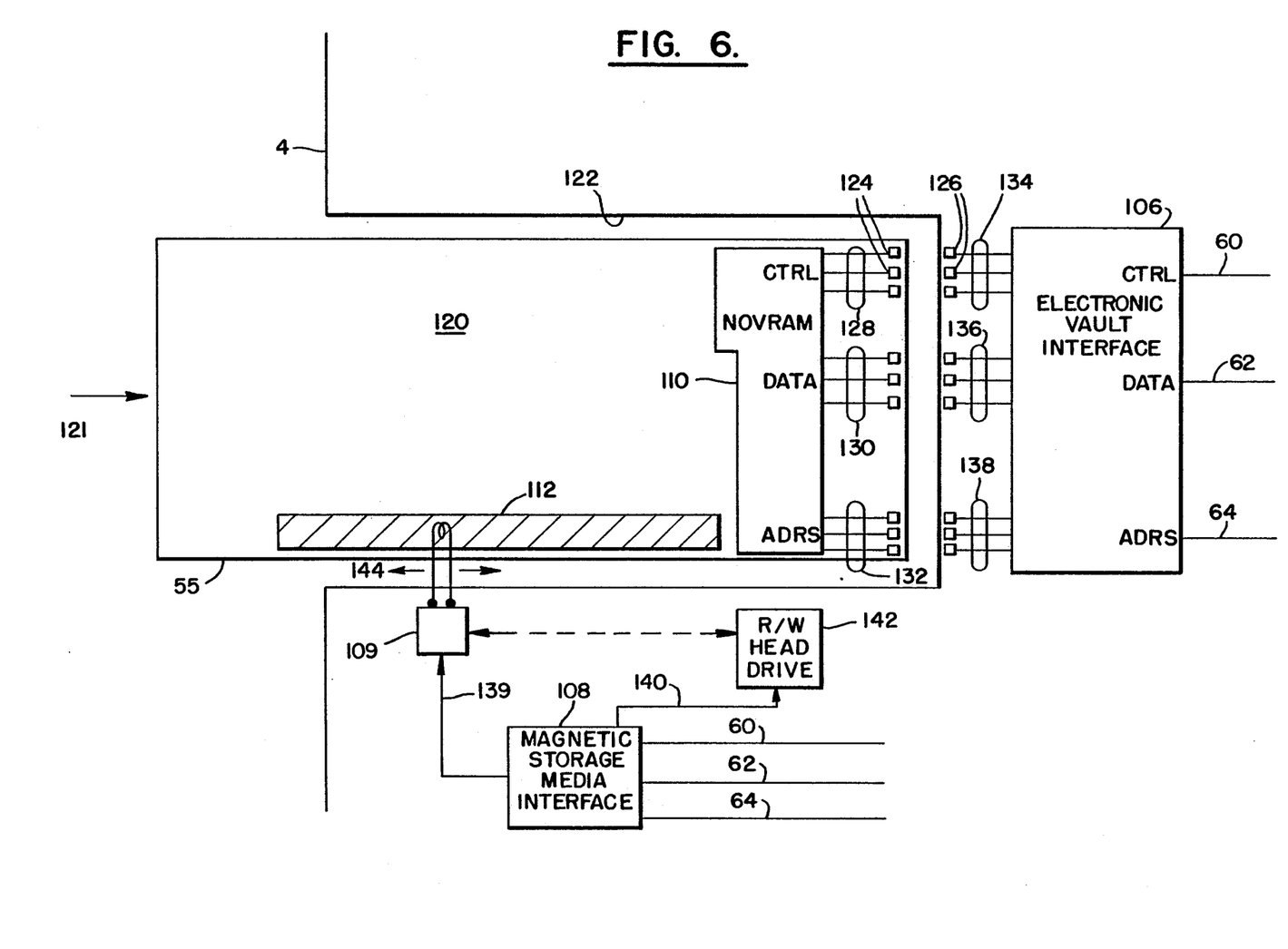
FIG. 6 is a block diagram showing the interface between the vault and the meter of FIG. 5.

Referring now to FIG. 6 there is shown the Vault 55 enclosure, or Vault Card 120 partially inserted within an opening 122 provided within the system 50 enclosure 4 (shown in FIG. 1). Enclosure 120 may be of any suitable shape, one such shape being that of a typical credit card. Disposed within Vault Card 120 is the NOVRAM 110 which contains one copy of the accounting data, such as the ascending and descending postal registers, required to be maintained by a postage meter.

The inclusion of electronic devices, such as NOVRAM 110, within credit card-like enclosures, and a method of constructing such "smart cards" is well known in the art. Illustrative of such a card containing an electronic device is U.S. Pat. No. 4,575,621, issued on Mar. 11, 1986 to H. Dreifus. Additionally, the fabrication of integrated circuit devices suitable for inclusion within such cards is discussed in an article entitled "Smart Cards", published in Scientific American, Vol. 253, No. 5, November 1985 at pages 152 to 159. The use of such cards is becoming increasingly advantageous for credit cards, bank cards, and other types of consumer related applications. Typically, such a card will contain, within a non-volatile memory device, information relating to the cards owner. Such information may include an account number and a credit balance, for a credit card, or a savings or checking account balance, for a bank card. In such consumer related applications the data stored within the card, or in a card-like module having a similar function, is also stored within the accounting storage devices of a separate processing unit, such as a central accounting and billing computer. Typically, the data within the card permits the consumer to make a transaction, such as purchasing goods or withdrawing funds from a bank account, without the active intervention of the central computer at the time of the transaction. So long as the card indicates that the consumer has sufficient funds to make the purchase or withdraw an amount of money, the transaction may be consumated locally, typically at a terminal provided for reading the data within the card and verifying the transaction. Such a terminal would also typically be operable for modifying the data within the card to reflect the results of the current transaction. The data relating to the consumer's account maintained by the central accounting computer may then be updated at a later time.

As may be appreciated, the Vault Card 120 of the invention differs from such consumer cards in that the accounting registers contained within, such as the ascending and descending postal fund registers, comprise the only record of the funds available to the user of System 50. That is, the accounting storage devices within the Card 120, although separable from the Meter 52, are equivalent to the accounting storage devices of the aforementioned central accounting computer used in conjunction with the consumer cards.

A function of Vault Card 120 is, therefore, to permit the printing of postage indicia by system 50 until the funds available therein are depleted to some minimum value. In addition, a function of the Card 120 is to permit the System 50 to be used without the requirement of providing complex mechanical security mechanisms to prevent the fraudulent use of the system, such fraudulent use being the unaccounted for printing of postage.

Furthermore, the Vault Card 120, in accordance with the invention, is provided with two dissimilar types of non-volatile memory devices to ensure the accuracy and security of the valuable accounting data stored within. As will now be discussed, there is disposed upon an outer surface of Vault Card 120 the MSM 112, which in this embodiment may be a strip of metalization operable for having data magnetically recorded thereon and read back by R/W head 109. MSM 112 has recorded thereon, typically, a second copy of the aforesaid accounting data. The data contained within MSM 112 is magnetically coupled between the Vault Card 120 and the Meter 52, while the data contained within NOVRAM 110 is, in this embodiment of the invention, electrically coupled to Meter 52 by means of a plurality of interconnecting pads 124. Pads 124 are disposed upon an outer surface of Vault Card 120 such that when Vault Card 120 is fully inserted within opening 122, as shown by the direction of the arrow 121, the pads 124 are in electrical contact with a plurality of mating pads 126. Thus NOVRAM 110 is operably coupled, via EVI 106, to the control bus 60, data bus 62 and address bus 64 of Meter 52. As can be seen, this coupling together is achieved by connecting a control bus 128, a data bus 130 and an address bus 132 of NOVRAM 110, through pads 124 and 126, to a suitably buffered control bus 134, data bus 136 and address bus 138 provided by EVI 106. Although three lines of each of the busses 128 through 138 are shown in FIG. 6 it is understood that each of the aforesaid busses may have more or less than three lines. Additionally, other lines (not shown) may be provided for coupling power from the system 50 to NOVRAM 110 or, alternatively, NOVRAM 110 may be powered from a suitable battery (not shown), such as a lithium battery, which would also be disposed within Vault Card 120. Although the interface between NOVRAM 110 and EVI 106 is shown in FIG. 6 to be a parallel type of interface, other well known types of interface schemes are also within the scope of the invention. For example, the interface could be achieved in a bit serial fashion, thereby reducing the number of pads 124 and 126 required. Alternatively, the pads 124 and 126 could be eliminated altogether by employing such devices as photoemitting diodes and photoreceptive transistors to optically couple data between NOVRAM 110 and EVI 106. In still another embodiment, the data may be capacitively coupled by means of a high frequency, phase or amplitude modulated signal. Thus, it may be realized that the advantages conferred on a postal mailing system by the use of the invention are not dependent on the particular method of coupling between NOVRAM 110 and EVI 106.

As has been previously mentioned, MSMI 108 is operative for coupling MSM 112, via R/W Head 109, to the control bus 60, data bus 62, and address bus 64 of Meter 52, these busses being monitored, as has been described, by Security Logic 66 to safeguard the accounting data stored within Vault Card 55. In operation, MSMI 108 converts the digital data appearing on busses 60, 62 and 64 to a format suitable for recording, via line 139, on MSM 112. During playback, MSMI 108 converts the low level signals appearing on line 139 to digital data suitable for transmission over bus 62. MSMI 108 is also operative to control, via a Head Control Bus (HCB) 140, the operation of a R/W Head Drive 142. Drive 142 is responsive to HCB 140 to cause R/W Head 109 to move as indicated by the arrows 144 relative to MSM 112, whereby data can be recorded and subsequently played back along the length of MSM 112. In order to accomplish the movement of R/W Head 109 Drive 142 may be a stepper motor having a rotational output coupled to a wormgear or a pulley arrangement. R/W Head 109 is suitably coupled to the wormgear or pulley such that Head 109 may be moved relative to MSM 112.

MSMI 108 may be comprised of a control microcomputer (not shown) and the requisite read/write circuitry (not shown) to record upon and playback data from MSM 112. Such a control microcomputer would be operable for communicating with the Accounting CPU 58 (shown in FIG. 5) by means of busses 60, 62 and 64. Such a control microcomputer would also be operable for controlling the recording and playback of data and, also, for controlling R/W Head Drive 142 via HCB 140 to position R/W Head 109 at a desired position along the length of MSM 112.

As has been previously mentioned, an aspect of the invention is to provide two dissimilar types of non-volatile storage devices, each storing a copy of the accounting data. The use of two dissimilar types of devices is based on the knowledge that while one type of non-volatile device may be sensitive to a particular data disrupting event, the other type of device may be immune to the event. For example, the proximity of a strong magnetic field or a sudden mechanical shock may disrupt the data stored within MSM 112, while NOVRAM 110 would be unaffected by such a data disrupting event. Alternatively, while a sudden surge or loss of power may affect the data within NOVRAM 110, MSM 112 would normally be unaffected by such a power fluctuation.

Thus, while the two dissimilar types of memories shown in this embodiment of the invention are a non-volatile RAM device and a magnetic storage media, other types of dissimilar non-volatile memory devices may also be used such as electrically eraseable read only memory (EEPROM), battery backed-up CMOS RAM, and bubble memory type devices. Therefore, the use of the invention should not be considered as being limited to the particular types of memory devices shown and described herein.

As has been mentioned, the above described embodiment can be modified in a variety of ways and those modifications would still be within the spirit and scope of the applicants' invention. For example, although the use of a plurality of non-volatile memories each of a different given type has been disclosed in the context of a card or module adapted for insertion and removal from the metering device, the invention may also be applied to a postage meter or other type of value printing system having integral accounting registers wherein it is desired to increase the reliability of the stored accounting data. Thus, while this invention has been disclosed by means of a specific, illustrative embodiment, the principals thereof are capable of a wide range of modification by those skilled in the art within the scope of the following claims.

What is claimed is:

1. A value printing system for printing a plurality of indicia respectively having a fixed pattern and a given value, said system comprising:
   a. means for printing respective indicia;
   b. value metering means, said metering means including first data processing means, said first processing means including means for storing data corresponding to the fixed pattern of said indicia, said first processing means adapted to receive data corresponding to each given value;
   c. a data storage module, said module removably connectable to said value metering means and including a plurality of dissimilar non-volatile memory means, each of said non-volatile memory means including a record of a total value currently available for printing indicia whereby said record is redundantly stored in said data storage module, each of said memory means connected to said first processing means when said module is connected to said metering means;
   d. said first processing means including means for generating a given signal when each given value to be printed does not exceed said total value currently available for printing indicia, said first processing means including means for deducting in turn each given value not exceeding said total value from said total value whereby said total value is maintained current; and
   e. means for controlling said printing means, said controlling means including second data processing means, and said second processing means including means responsive to said signal for causing said printing means to print an indicia.

2. The system according to claim 1, wherein said data storage module includes a battery connected to provide power to at least one of said dissimilar memory means.

3. The system according to claim 1 including an encryption key code stored in each of said dissimilar memory means.

4. The system according to claim 1, wherein said indicia is a postage indicia.

5. The system according to claim 1, wherein said indicia includes a date.

6. The system according to claim 1, wherein said indicia includes information corresponding to a geographic location.

7. The system according to claim 1, wherein said first and second processing means each include a microprocessor.

8. The system according to claim 1, wherein said printing means includes ink jet printing means.

9. The system according to claim 1, wherein one of said dissimilar memory means is a non-volatile RAM and the other of said memory means is a magnetic storage media, and said system including means for reading data from and writing data into said magnetic storage media.

10. The system according to claim 1, wherein said first processing means includes a microprocessor and logic circuit and ROM, and said logic circuit communicating with at least one of said dissimilar memory means and ROM under control of the microprocessor for determining when each given value does not exceed the total value currently available for printing.

11. The system according to claim 1, wherein said first processing means includes a serial number for said metering means, at least one of said dissimilar memory means including an encryption key code stored therein, said first processing means including means for utilizing said serial number and key code for generating an encrypted validation number, and said signal including said encrypted validation number.

12. The system according to claim 1, wherein said data storage module is one of a plurality of data storage modules respectively removably connectable to said value metering means, whereby a given one of said modules may be replaced with another given one of said modules.

13. The system according to claim 1, wherein said dissimilar non-volatile memory means are two non-volatile memory means selected from a group consisting of a non-volatile RAM, a magnetic storage media, an EEROM, a battery backed CMOS RAM and a bubble memory.

14. The system according to claim 1, wherein one of said dissimilar memory means is more tolerant to an occurrence of a given fault condition than the other of said dissimilar memory means.

15. A data storage module for use in a system for controlling printing means to print a plurality of indicia respectively having a fixed pattern and a given value, wherein said system includes value metering means having data processing means including means for deducting in turn respective given values to be printed from a total value stored in each of two dissimilar memory means, said module comprising:
   means for removably connecting said module to said value metering means, a plurality of dissimilar non-volatile memory means adapted to be connected to said first processing means when said module is connected to said metering means, and each of said non-volatile memory means including a record of a total value currently available for printing indicia whereby said record is redundantly stored in said module.

16. The module according to 15, wherein said module includes a battery connected to provide power to at least one of said dissimilar memory means.

17. The module according to claim 15 including an encryption key code stored in at least one of said dissimilar memory means.

18. The module according to claim 15, wherein said value is a postage value.

19. The module according to claim 15, wherein one of said dissimilar memory means is a non-volatile RAM and the other of said memory means is a magnetic storage media.

20. The module according to claim 15, wherein said dissimilar non-volatile memory means are two non-volatile memory means selected from a group consisting of a non-volatile RAM, a magnetic storage media, an EEROM, a battery backed CMOS RAM and a bubble memory.

21. The module according to claim 15, wherein said means for removably connecting said module includes means for removably connecting said module to means for increasing each total value currently available for printing indicia to a new value.

* * * * *